INVENTOR.
EARL C. RHYNE JR.

May 21, 1957

E. C. RHYNE, JR 2,793,340

CONSTANT INPUT-IMPEDANCE SYSTEM FOR SPEED
CONTROL OF A.-C. MOTORS

Filed May 9, 1956

INVENTOR.
EARL C. RHYNE JR.

INVENTOR.
EARL C. RHYNE JR.

INVENTOR.
EARL C. RHYNE JR.

United States Patent Office 2,793,340
Patented May 21, 1957

2,793,340

CONSTANT INPUT-IMPEDANCE SYSTEM FOR SPEED CONTROL OF A.-C. MOTORS

Earl C. Rhyne, Jr., East Pepperell, Mass., assignor to Cline Electric Manufacturing Company, Chicago, Ill., a corporation of Delaware Application May 9, 1956, Serial No. 583,878

10 Claims. (Cl. 318—229)

My invention relates to systems for controlling the speed of alternating-current induction motors with the aid of saturable reactors or other control devices connected in the stator circuit of the motor and capable of varying its terminal voltage in response to a variable operating condition of the motor.

It is known to control the saturation and thereby the impedance of such reactors in response to direct speed intelligence such as speed-proportional voltage taken from a tachometer generator, or in response to indirect speed intelligence formed by a combination of voltage or current quantities derived from the electric circuits of the motor and jointly indicative of the motor speed. In either case, the speed intelligence is compared with a selected pattern or datum voltage, and the differential effect serves to control the reactor saturation and impedance in the sense required to eliminate any departure of the motor speed from the desired value. The tachometer-controlled systems, of course, require the addition of dynamo-electric machinery. The known systems operating without direct speed intelligence are apt to be less accurate in maintaining constant speed with changing motor loads unless an appreciable amount of compensating equipment is added. Besides, stator-voltage control by saturable reactors, generally, involves the possibility that excessive currents may occur at low-speed operation although the external load upon the motor may not be excessive.

It is an object of my invention to provide motor speed control systems, generally of the type above mentioned, that operate without direct speed intelligence and secure a reliably regulated speed control with the aid of adjustable resistance in the rotor circuit of the motor.

Another object of my invention is to make a reactor-controlled speed-regulating system inherently current limited so as to obviate the occurrence of overcurrent conditions in the absence of external motor overloads.

To achieve these objects, and in accordance with my invention, I subject the terminal-voltage controlling device of the system to control-intelligence proportional to the ratio of motor terminal voltage ($E_T$) to line current ($I_L$) so that this ratio $$\left(\frac{E_T}{I_L}\right)$$

remains constant; and I set the speed of the motor simply by varying the resistance of the rotor circuit. Since the ratio of terminal voltage to line current represents the input impedance of the motor, it will be recognized that in such a system the motor tends to run at a speed such that the input impedance remains constant. For any fixed value of rotor resistance, this condition occurs only at one definite speed of the motor. Consequently, by setting or adjusting the resistance in the rotor circuit to respectively different values, the motor is controlled to run at correspondingly different, stable speeds within the available speed range of the system, regardless of changes in motor load.

The foregoing and other objects, advantages and features of my invention will be apparent from the following description of the embodiments shown by way of example on the accompanying drawings, in which.

Figure 1:
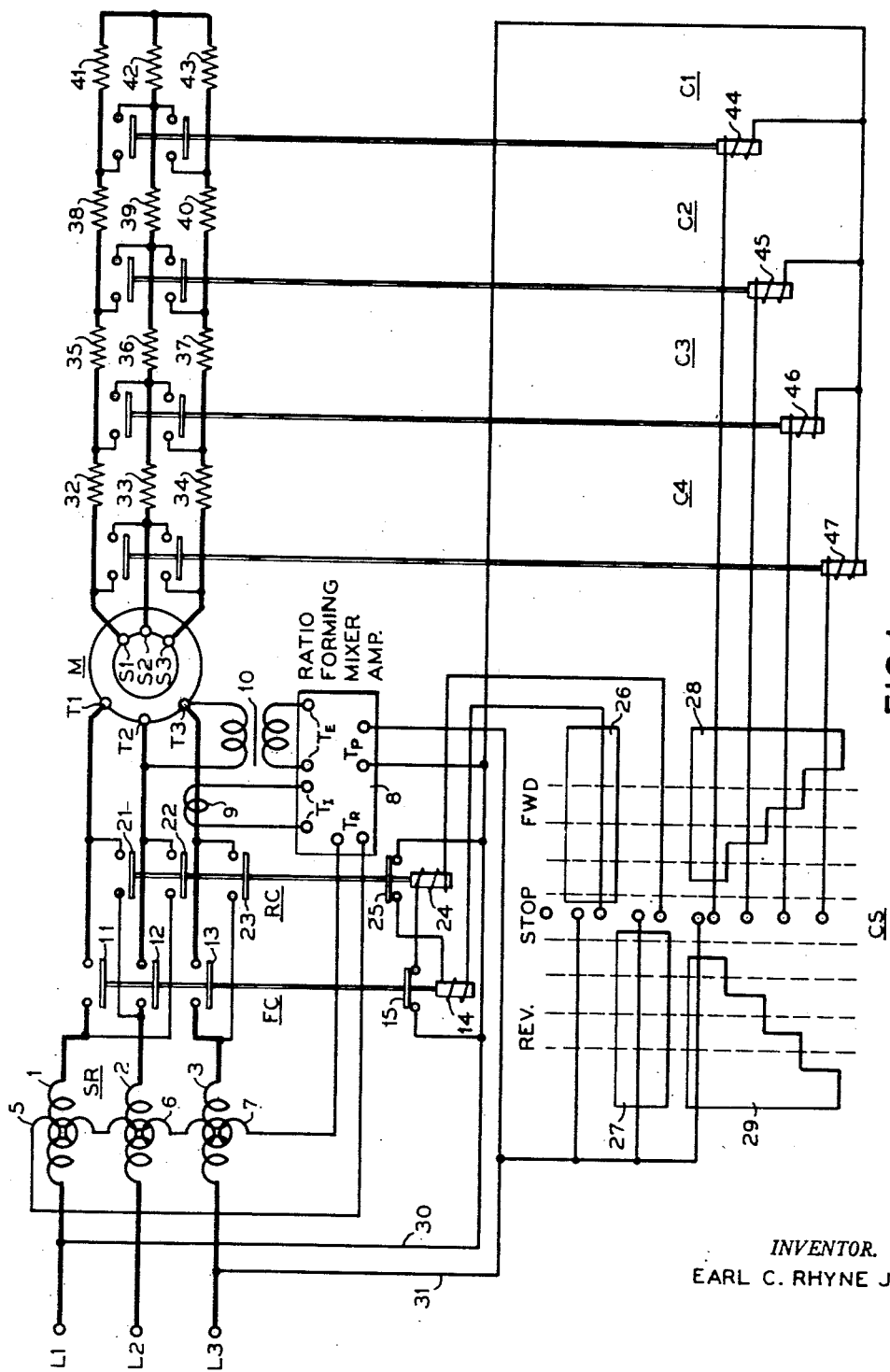
Fig. 1 is a schematic circuit diagram of a speed control system for a wound-rotor motor.

In the system according to Fig. 1, a wound-rotor motor M has its stator terminals T1, T2, T3 connected to line terminals L1, L2, L3 through the respective main windings 1, 2, 3 of a saturable-core reactor device SR. The degree of saturation of device SR, and consequently the effective impedance of the main windings 1, 2, 3, is controlled by direct-current control coils 5, 6, 7 energized from the output terminals $T_R$ of a mixer-amplifier 8. The mixer-amplifier 8 has two pairs of input terminals $T_I$ and $T_E$. Terminals $T_I$ are connected to a current transformer 9 responsive to the line current ($I_L$) so that the voltage or current intelligence supplied at terminals $T_I$ is proportional to the current in the primary circuit of motor M. Terminals $T_E$ are connected through a voltage transformer 10 across the stator terminals T2 and T3 so that the voltage or current intelligence supplied to the mixer-amplifier at terminals $T_E$ is proportional to the terminal voltage of motor M.

Details of mixer-amplifiers suitable for the invention will be described in a later place; but for understanding the operation of the system shown in Fig. 1 it suffices to know that the mixer-amplifier 8 is essentially a ratio forming device which supplies from its output terminals $T_R$ a direct current proportional to the ratio of the two input magnitudes received at terminals $T_E$ and $T_I$ respectively. That is, the current supplied by the mixer-amplifier 8 to the saturable-reactor control coils 5, 6, 7 is proportional to the ratio $$\left(\frac{E_T}{I_L}\right)$$

of motor terminal voltage to line current.

The connection of the reactor device SR with the motor terminals is controlled by the contacts 11, 12, 13 of a "forward" contactor FC whose control coil 14 also operates at a normally closed interlock contact 15. The connection between motor and reactor device as alternatively controlled by the contacts 21, 22, 23 of a "reverse" contactor RC, these contacts being operated by a control coil 24 which also actuates a normally closed interlock contact 25. Only one of the two contactors FC and RC can pick up at a time to make the motor M run in one or the other direction. The operation of the contactors is controlled by a control switch or master controller CS which, for simplicity, is illustrated as a drum switch in developed form. The control switch is shown provided with contact segments 26, 27, 28 and 29 which control the supply of current from line terminals L1 and L3 through supply leads 30 and 31.

An external resistance circuit, comprising twelve resistors 32 to 43, is connected to the slip-ring terminals S1, S2, S3 of the motor. The resistors are controlled in groups of three by contactors C1, C2, C3, C4 whose respective control coils 44, 45, 46, 47 are energized between leads 30 and 31 under control by the segments 28 and 29 of control switch CS. For simplicity, the relays often used between the control switch and the respective contactors are omitted.

Before explaining the functioning of the system components essential to the invention, let us first assume that the main windings 1, 2, 3 of the saturable reactor device SR are absent or shorted so that the reactor device SR as well as the mixer-amplifier 8 are entirely ineffective. It will be recognized that then the design and operation of the control system are in accordance with the conventional art. That is, when the control switch CS is moved from the illustrated stop position to first position forward, the segment 26 closes the circuit of coil 14 so that the forward contactor FC picks up and energizes the motor M to run in the forward direction. All resistors 32 to 43 are then effective in the rotor circuit for slow acceleration. When switch CS is advanced to second position forward, coil 44 of contactor C1 is additionally energized, and contactor C1 shorts the resistors 41, 42, 43 to run the motor M at higher speed. Similarly, the contactors C2, C3, C4 are actuated sequentially when the switch CS is moved into the next sequential forward positions, thus accelerating the motor in accordance with the setting of the control switch CS. When the switch CS is moved from the illustrated stop position to any reverse position, the contactor RC is energized to make the motor run in the reverse direction under accelerating conditions depending upon the selected setting of switch CS.

Now, in such a conventional-type system, the secondary resistors 32 to 43 and the appertaining contactors C1 to C4 do not actually control the motor speed. They rather determine the accelerating conditions of the motor for any given load. Changes in motor loading cause changes in speed so that it is necessary for the operator to actuate the master controller in accordance with his observation, and no regulation for constant speed is inherent in the system.

The illustrated control system, however, affords a fundamentally different performance by virtue of the features according to the invention now to be considered.

When the reactor device SR is in operation, the effective impedance of main windings 1, 2, 3 is so varied that the line current $I_L$ flowing in the primary circuit of the motor is substantially proportional to the direct current supplied to the saturation control coils 5, 6, 7. As mentioned, this direct current is controlled in dependence upon the terminal voltage $E_T$ supplied through transformer 10, and in dependence upon the line current $I_L$ effective through the current transformer 9, with the result that the control current in coils 5, 6, 7 is proportional to the ratio $$\frac{E_T}{I_L}$$

Consequently, the system regulates the motor speed for constant input impedance, and since for any given resistance in the motor circuit there is only one definite speed value which satisfies the condition of constant input impedance, the motor speed tends to remain constant in accordance with the particular resistance value effective in the secondary circuit, regardless of the torque required at the motor shaft.

Consequently, when the control switch CS is moved from the illustrated stop position to the first step forward or reverse, the motor will run at a minimum speed and the system is self-regulating and tends to maintain this speed at the one constant value predetermined by the selected total resistance of resistors 32 to 43. When the control switch CS is moved to the next position and contactor C1 shorts the resistors 41, 42, 43, the system automatically regulates the motor for a stable speed of the next higher value, this value being again predetermined by the then effective total resistance of the rotor circuit. Analogously, each other setting of the master control switch determines a selected fixed datum value for the motor speed, and the system is inherently operative to regulate this speed for constancy. The operator is no longer called upon to observe the load-responsive behavior of the motor. Such a system is applicable for requirements demanding a predetermined load-independent speed setting, despite the fact that no external speed intelligence is used and that no load-sensing or speed-sensing device is needed other than the fundamental system components mentioned in the foregoing.

Figure 2:
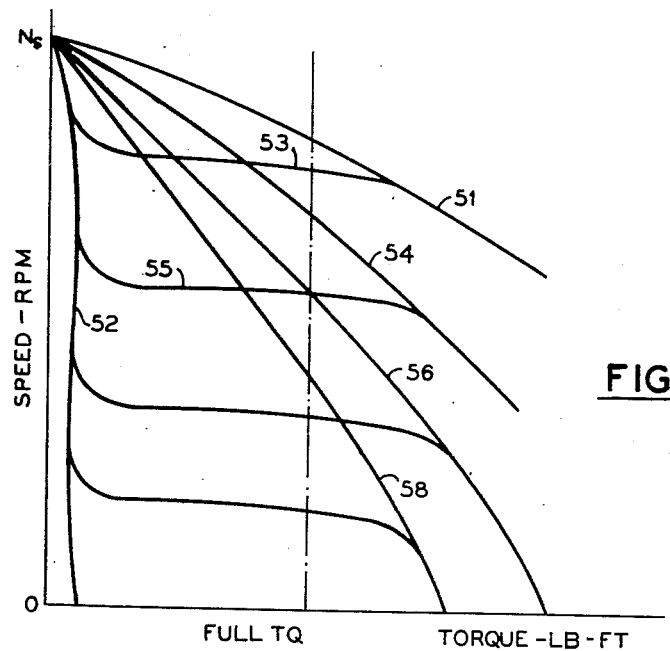
Fig. 2 is a speed torque diagram explanatory of the operation of systems according to the invention.

The performance of the system will be further understood from the typical speed-torque characteristics illustrated in Fig. 2. The speed-torque curve 51 is obtained with minimum rotor resistance and full line voltage applied to the terminals T1, T2, T3 of the motor. That is, curve 51 represents the conditions obtaining in the system of Fig. 1 when contactor C4 is closed and when the impedance of reactor main windings 1, 2, 3 is a minimum (or eliminated by shorting these windings). Curve 52 represents the speed-torque condition when the saturable reactor device has maximum impedance, that is when the control current in saturation control coils 5, 6, 7 is zero. Curve 53 is obtained by means of the impedance regulator by virtue of the constant feed-back ratio $$\frac{E_T}{I_L}$$

and with the same minimum value of rotor resistance that produces the curve 51 at full voltage. When the rotor resistance is increased by a first fixed amount, for instance by opening of contactor C4 in Fig. 1, a speed-torque characteristic according to curve 54 could obtain if full line voltage were applied to the motor terminals; but the actual speed-torque performance of the system due to the constant-impedance regulation is as shown by curve 55. As the rotor resistance is increased by a second-fixed amount, curve 56 would be obtained if the full line voltage were effective on the motor terminals, but curve 47 represents the actual speed-torque conditions obtaining by virtue of the constant-impedance regulation. Similarly, the speed-torque characteristic 58 would obtain at full voltage if the rotor resistance is set to the maximum value; but the actual performance is represented by curve 59. Curves 53, 55, 57, 59 are obtained with a single fixed setting of the ratio $$\frac{E_T}{I_L}$$

That is, nothing is changed in the system except that the secondary resistance of the motor is selectively varied as described with reference to Fig. 1.

It has been mentioned that saturable reactor control systems for induction motors may cause excessive currents to flow in the motor although no excessive torque loading may be imposed upon the motor. This is due to the fact that when the motor runs at subsynchronous speed and hence operates with appreciable slip, part of the power supplied to the motor must be dissipated in the motor and in any resistor in its rotor circuit. Therefore, when the motor runs at a speed far below synchronism, the current may reach overload conditions even though there is no mechanical overload imposed upon the motor. In this respect, the invention affords the advantage that its components can readily be rated to provide for inherent current limitation.

For this purpose the feed-back ratio $$\frac{E_T}{I_L}$$

can be so chosen that it is equal to the ratio of line voltage to rated motor amps. Under such conditions, when the saturable reactor device is fully saturated, the line current does not exceed the rated motor current unless an external overload actually exists. The impedance ratio can thus be set to limit the current into the motor to any desired value within the capacities of the equipment. This is an essential advantage over the above-mentioned motor control systems heretofore available.

It will be understood from the foregoing that the ratio-forming mixer-amplifier device in a system according to the invention may consist of any equipment capable of delivering an electric output magnitude in proportion to the ratio of two input magnitudes. A variety of devices of such type are known as such, particularly as components in electric computing apparatus. Such a ratio-forming device may comprise mechanisms, or it may include electronic tube circuits, transistors or other semiconductor devices, magnetic amplifiers or similar saturable reactor devices. Any of these types of devices are applicable for the purpose of my invention, if necessary in combination with a power amplifier for delivering the magnitude of direct current needed for the saturation control coils of the impedance regulating device in the motor circuit. One of the known ratio computers, adapted for the purpose of the present invention, is illustrated in Fig. 3 and described presently by way of example.

Figure 3:
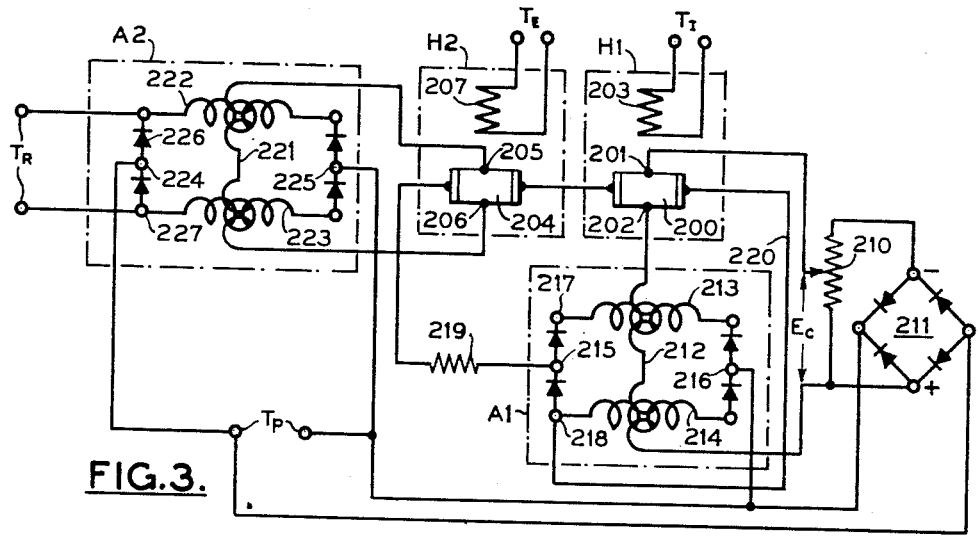
Fig. 3 is the schematic circuit diagram of a ratio-forming mixer-amplifier applicable in a control system according to Fig. 1.

The ratio-forming mixer-amplifier schematically represented by the circuit diagram shown in Fig. 3 is essentially composed of four components, namely two Hall generators H1, H2 and two linear amplifiers A1, A2 preferably, and as shown, of the magnetic type. The four pairs of terminals denoted by $T_E$, $T_I$, $T_R$ and $T_P$ correspond to the identically designated respective terminal pairs in Fig. 1.

The Hall generator H1 is provided with a semiconducting resistance body 200 which, aside from its two current supply terminals, has two electrodes 201, 202 located on respective points which have the same electric potential when current is flowing through the semiconductor 200 and the semiconductor is not subjected to a magnetic field. The Hall generator is further provided with a magnetic field system excited by a coil 203 which, when in operation, subjects the semiconductor 200 to a magnetic field perpendicular to the plane defined by the current-flow axis and by the spacing between the electrodes 201 and 202. Such a Hall generator is essentially a multiplying device, as the Hall voltage between the electrodes 201 and 202 is proportional to the product of the electric current flowing through the semiconductor 200 times the magnetic field strength produced by the excitation coil 203.

The Hall generator H2 is a duplicate of Hall generator H1. Accordingly, it comprises a semiconductor 204 with Hall electrodes 205, 206 and a magnetic field produced by an excitation coil 207.

The Hall generator H1 serves to translate the signal current applied to terminals $T_I$ into a current proportional to the reciprocal value $$\frac{1}{T_I}$$

of the input signal. To this end the Hall voltage generated between electrodes 202 and 203 is compared with a constant reference voltage Ec taken from across an adjusted portion of a rheostat 210. The rheostat is energized from a direct-current source of constant voltage formed by a rectifier 211 connected to the power supply terminals $T_P$. The resulting differential voltage is effective across the input-coil circuit 212 of the amplifier A1 to control the saturation and effective impedance of the amplifier main windings 213, 214 loop-connected with four half-wave rectifiers. The power input terminals 215, 216 of the loop circuit are connected to the power supply terminals $T_P$. The direct-current output terminals 217, 218 of amplifier A1 supply current to both semiconductors 201 and 204 through a calibrating resistor 219. Due to the feed-back connection between the Hall voltage output of generator H1 and the input current flowing through the semiconductor 201 of the same Hall generator, this generator is so regulated that any change in Hall voltage caused by a change in excitation of coil 204 is eliminated by a corresponding change in the current passing from amplifier A1 through the semiconductor circuit 220. As a result the current flowing through semiconductor 200 is inversely proportional to the excitation current applied to input terminals $T_I$ and thus is proportional to $$\frac{1}{I_L}$$

This reciprocal current is also effective in the Hall generator H2 where it passes through the semiconductor 204. Consequently, the Hall voltage between electrodes 205 and 206 is proportional to the product of the reciprocal value $$\frac{1}{I_L}$$

times the signal current applied through terminals $T_E$ to the excitation coil 207. Therefore, the output voltage taken from across the electrode 205, 206 is proportional to the ratio $$\frac{E_T}{I_L}$$

This voltage is applied to the input coils 221 of the power amplifier A2. The main windings 222, 223 of amplifier A2 are connected in a loop circuit with four half-wave rectifiers. The loop circuit is energized at terminals 224, 225 from power supply terminals $T_P$. The output terminals 226 and 227 of amplifier A2 are connected with the output terminals $T_R$.

As mentioned, the ratio-forming components of the device shown in Fig. 3 do not as such form part of my invention but were known for computing purposes in general. It will be obvious that, in principle, any other known type of ratio-computing device is likewise applicable for the purposes of my invention.

According to another feature of my invention, however, it is not necessary to provide a ratio-forming device of such extreme accuracy as is usually required in electric calculating equipment. It rather suffices to operate with a computing accuracy within the obtainable accuracy limits of the motor speed control performance. From that viewpoint, and in accordance with another feature of my invention, I preferably provide a mixer-amplifier that operates on the principle of forming the difference of the two input signals and amplifying that difference with such a high feed-back gain that the amplified output quantity is substantially proportional to the ratio of the input signals. Such an operation requires that the combined effect of the input magnitudes $E_T$ and $I_L$ be of a smaller order of magnitude than the effects of each individual input quantity alone. This will be more fully explained with reference to Fig. 4 showing such a ratio-forming device as part of a system according to the invention.

Figure 4:
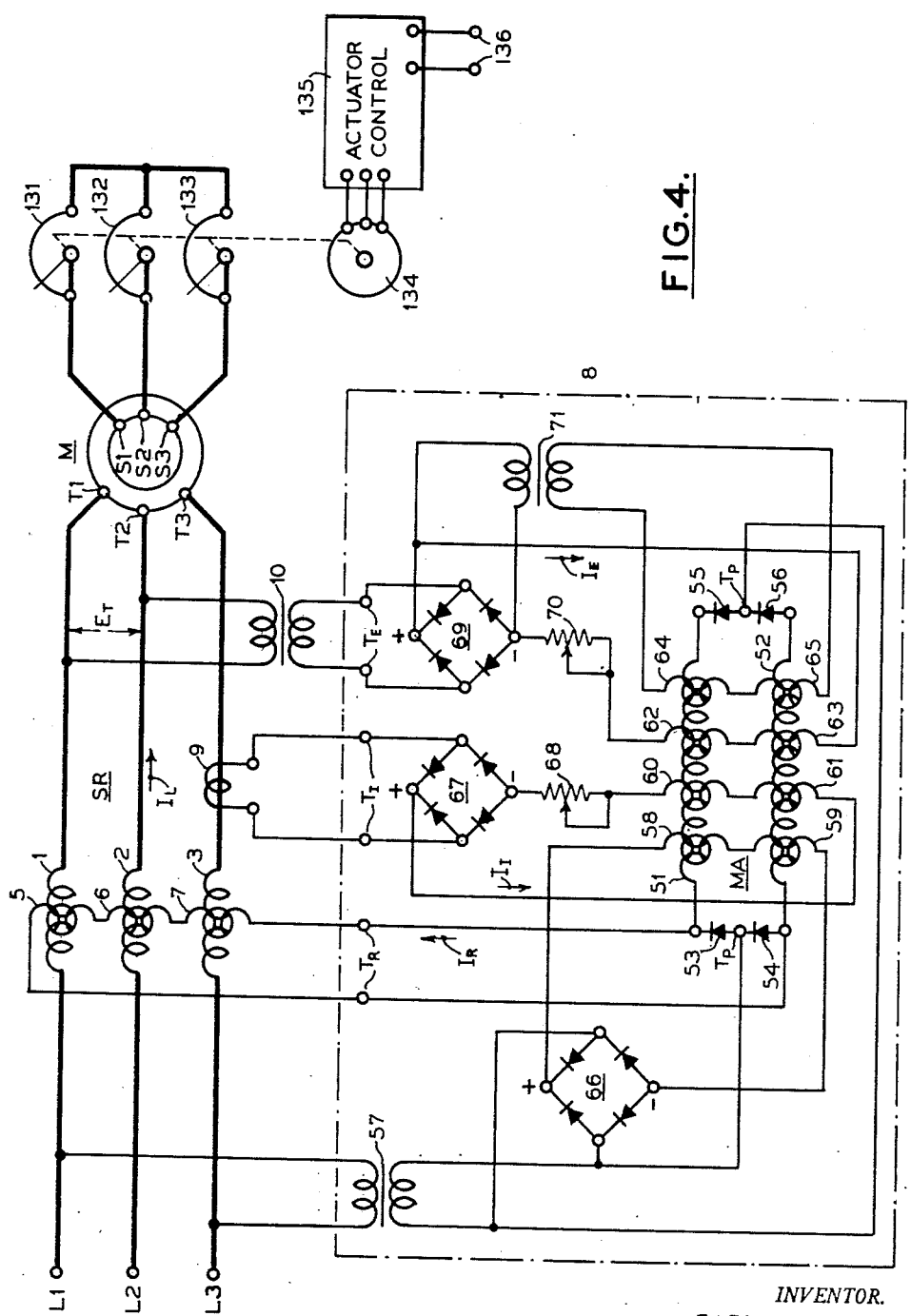

In the schematic circuit diagram of Fig. 4, all switches and contactors not essential to the invention proper are omitted. The motor M has its terminals T1, T2, T3 connected to line terminals L1, L2, L3 through the main windings 1, 2, 3 of saturable reactor device SR. The saturation control coils 5, 6, 7 of device SR are connected to the direct-current output terminals $T_R$ of the mixer-amplifier 8. Input signals are applied to the mixer-amplifier at terminals $T_I$ from a current transformer 9, and at terminals $T_E$ from a voltage transformer 10 connected across the motor terminals T1 and T2.

The slip-ring terminals S1, S2, S3 of motor M are connected to three resistors 131, 132, 133 which in this embodiment are continuously adjustable by means of slide contacts. The slide contacts are geared to a pilot motor or actuator 134 which is controlled by suitable control equipment 135 to run in one or the other direction in dependence upon the magnitude and polarity of control intelligence applied to terminals 136.

The mixer-amplifier 8 is provided with a magnetic amplifier. The main windings 51, 52 of the amplifier are connected in a loop circuit with four half-wave rectifiers 53, 54, 55, 56 so that two parallel branch circuits are formed which are energized at power input terminals $T_P$ by alternating-current supplied through a transformer 51 from line terminals L1, L3. The saturable magnet cores of respective windings 51 and 52 are provided with four pairs of direct-current coils 58 and 59, 60 and 61, 62 and 63, 64 and 65. Coils 58 and 59 merely serve to supply constant bias voltage from a rectifier 66 connected to transformer 57.

The current-transformer terminals $T_I$ of the mixer-amplifier 8 are connected to a rectifier 67 which supplies rectified current ($I_I$) through a calibrating rheostat 68 to coils 60 and 61. This current is proportional to the line current $I_L$ of the motor.

The voltage-transformer terminals $T_E$ of the mixer-amplifier are connected to a rectifier 69 which supplies current ($I_E$) through a calibrating rheostat 70 to coils 62 and 63. This current is proportional to the terminal voltage $E_T$ of the motor.

The coils 64 and 65 are connected to the secondary winding of a damping transformer 71 whose primary circuit is connected to transformer 69. Coils 64 and 65 receive voltage only when the terminal voltage of motor M is changing and have the effect of stabilizing the operation of the magnetic amplifier to prevent hunting.

The rectified output current $I_R$ of the magnetic amplifier, flowing between output terminals $T_R$ through the saturation control coils 5, 6, 7 of the impedance regulating device SR, is essentially determined by the two signal currents $I_I$ and $I_E$. The pairs of control windings 60, 61 and 62, 63 are poled for mutually opposing effects upon the saturation of the magnetic amplifier windings 51 and 52. Consequently, the output current $I_R$ supplied to saturation control coils 5, 6, 7 is dependent jointly upon the two input currents $I_I$ and $I_E$.

In order to have the amplifier output current proportional to the ratio of the input signals $E_T$ and $I_L$, notwithstanding the fact that the amplifier input is proportional to the difference of the primary signals $I_I$ and $I_E$, the differential effect upon the amplifier must be very small in comparison with the effect which each individual input signal would have if alone effective, and the feedback gain of the regulating system must be sufficiently high. This will be understood from the following numerical example.

Assume, for explanation, that the current $I_E$, flowing in coils 62, 63 and proportional to the motor terminal voltage, is negligible and that the current $I_I$, flowing in coils 60, 61 in proportion to the line current $I_L$, is 1 amp causing an amplified current $I_{R1}=100$ amps. to flow through coils 5, 6, 7. Since the current $I_I$, now alone effective to cause $I_{R1}$, is proportional to $I_L$, we can set $I_{R1}=K_1.L_1=100$, wherein the term $K_1$ is a constant.

Then assume that $I_E=1$ amp, and $I_I=0$, causing the current in coils 5, 6, 7 to be $I_{R2}=99$ amps. We can set $I_{R2}=K_2 E_T=99$, wherein $K_2$ is another constant.

Under these assumptions, when $I_E=1$ amp and $I_I=1$ amp, then the current flowing in coils 5, 6, 7 is $$I_R = I_{R1} - I_{R2} = K_1 I_L - K_2 E_T = 100 - 99 = 1 \text{ amp.}$$

It will be recognized that in accordance with the numerical data of this example, the regulating value of $I_R$ may vary between zero and a value in the order of 1 amp., which is very small compared with the currents $$I_{R1} = K_1 I_L, \text{ and } I_{R2} = K_2 E_T$$

Hence: $K_1 I_L \approx K_2 E_T$, and $$\frac{K_1}{K_2} \approx \frac{E_T}{I_L}$$

Under such operating conditions the direct current controlling the impedance regulating device SR can be made proportional to the ratio $$\frac{E_T}{I_L}$$

within any required accuracy limits because, by increasing the currents $I_E$ and $I_I$ relative to their differential effect upon the magnetic amplifier, the accuracy can be increased to any desired degree.

It will be recognized that the mixer-amplifier, in order to deliver an output current proportional to the ratio of the two input currents, must satisfy the following conditions.

In the first place, the components that supply the line-current responsive signal must be poled for positive current feed-back. That is, an increase in signal current $I_I$ must tend to increase the amplifier output current $I_R$ and hence also the line current $I_L$. The components that supply the terminal-voltage responsive signal current $I_E$ must be poled for negative voltage feed-back. That is, an increase in signal current $I_E$ must tend to reduce the amplifier output current $I_R$ and hence also the line current $I_L$.

Another condition, already mentioned, is that the individual magnitudes of the signal currents $I_I$ and $I_E$ must be of a larger order of magnitude than the differential effect, expressed in terms of current, upon the magnetic amplifier, and that the amplifier must have a sufficiently high gain and linear response to satisfy the above-explained requirements within the entire range of desired speed-control performance.

The requirement for comparatively large signal currents will be more fully understood if one considers that the resulting effect of the two signal currents need be equivalent to a current in the order of, say, 10 milliamps. That is, a current in the order of amperes must flow in each of the two signal circuits to produce a resultant effect amounting to only a very small fraction of this value. It will be apparent therefore that the accuracy of a ratio-forming computer of this type should not, and need not, be driven to a point where the current losses in the computing component become excessive or uneconomical.

In the system of Fig. 4, the ratio $$\frac{E_T}{I_L}$$

can be set to any value within the available limits by correspondingly setting the rheostats 68 and 70. Once set, the ratio remains fixed and the speed control of the motor M is effected only by adjustment of the resistors 131, 132, 133. While an automatic adjustment in response to a signal at terminals 136 is illustrated, the system can be controlled manually, for instance as exemplified by Fig. 1, or in any other manner resulting in a change of resistance in the rotor circuit.

It will be understood, that a mixer-amplifier of the type described above with reference to Fig. 4 may also be used in other systems according to the invention, for instance in a system otherwise designed in accordance with Fig. 1.

Figure 5:
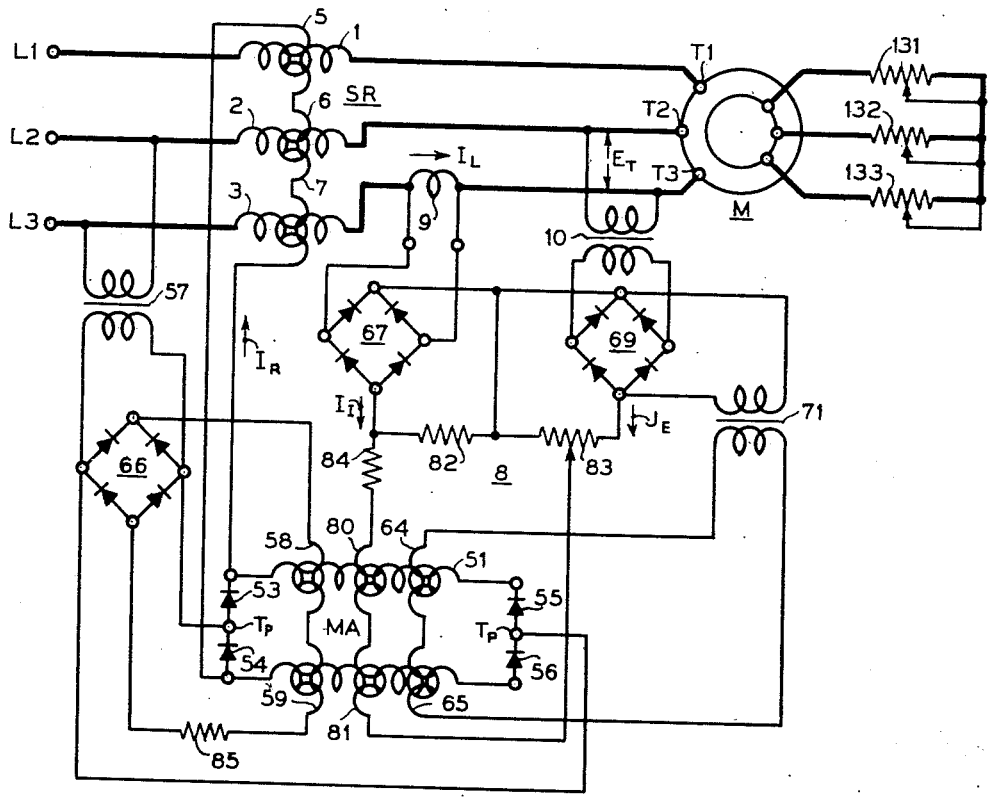
Figs. 4 and 5 are schematic circuit diagrams of two other wound-rotor motor control systems respectively.

The system shown in Fig. 5 differs from that of Fig. 4 essentially only with respect to a modification of the ratio computing mixer-amplifier. Since the similarities between the two systems are obvious from the use of the same reference characters for similar respective elements, it will suffice to describe only the essential differences.

While according to Fig. 4 the magnetic amplifier is provided with two pairs of input coils 60, 61 and 62, 63 for the current-responsive intelligence $I_I$ and the voltage-responsive intelligence $I_E$ respectively, the mixer-amplifier shown in Fig. 5 has only one pair of direct-current input coils 80 and 81 responsive to a differential intelligence value formed with the aid of an electric comparator circuit. This circuit comprises the coils 80 and 81 in series connection with two resistors 81 and 82. If desired, and as shown, a calibrating resistor 84 may also be provided in this circuit. Resistor 81 is connected across the rectifier 67 to receive from current transformer 9 the intelligence current $I_I$. Resistor 82 is connected across the rectifier 69 to receive from voltage transformer 10 the intelligence current $I_E$. The tap of resistor 82 serves for calibrating purposes or for setting a desired value of the ratio $$\frac{E_T}{I_L}$$

but this value, once set, remains fixed during the normal speed controlling performance of the system. The currents $I_I$ and $I_E$ have opposing effects with respect to the circuit of amplifier input coils 80 and 81 so that only a differential current value is effective in these coils. In all other respects the system is designed and operative similar to the above-described system of Fig. 4. That is, the saturable reactor device SR is controlled in dependence upon the ratio $$\frac{E_T}{I_L}$$

and this ratio is fixed during normal operation so that the control of the motor speed is effected only by change in adjustment of the secondary resistors 131, 132, 133.

In order to illustrate the high feed-back gain required of the computing and amplifying components to produce in the system of Fig. 5 the desired regulation for constant input impedance of the motor M, a numerical example is presented in the following.

Assume that the rated current of motor M is 10 amps. and that the rated terminal voltage is 220 volts. The resistor 81 may then be given a resistance rating as needed to provide for a current $I_I$ of 1 amp. when the magnitude of the line current $I_L$ has the rated value of 10 amps. Under these conditions the voltage drop across resistor 81 may be 10 volts. Similarly, the transformer 10, rectifier 69 and resistor 82 are rated to provide across the resistor 82 a current of 1 amp. and a voltage drop of approximately 10 volts at the rated terminal voltage of 220 volts. With a total resistance of about 10 ohms in the circuit of coils 80, 81, the differential voltage impressed across the amplifier input coils 80, 81 is in the order of 0.1 volt. Required for the control of the amplifier is a current in coils 80, 81 in the order of 10 milliamps. A change of 0.1 volt across the input coils 80, 81 may produce a change of about 10 amps. in the amplifier output circuit, this being in accordance with the performance of conventional magnetic amplifiers. It will be noted that, although under the conditions of the example here presented, the magnetic amplifier is capable of producing a change of 10 amps. in its output circuit, only approximately 0.1 amp. is needed and normally effective in that output circuit to control the saturable reactor device SR.

With a high feed-back gain as exemplified by the numerical data, the accuracy of regulation for constant input impedance has a sufficiently high degree to satisfy most exacting requirements of motor speed control.

Figure 6:
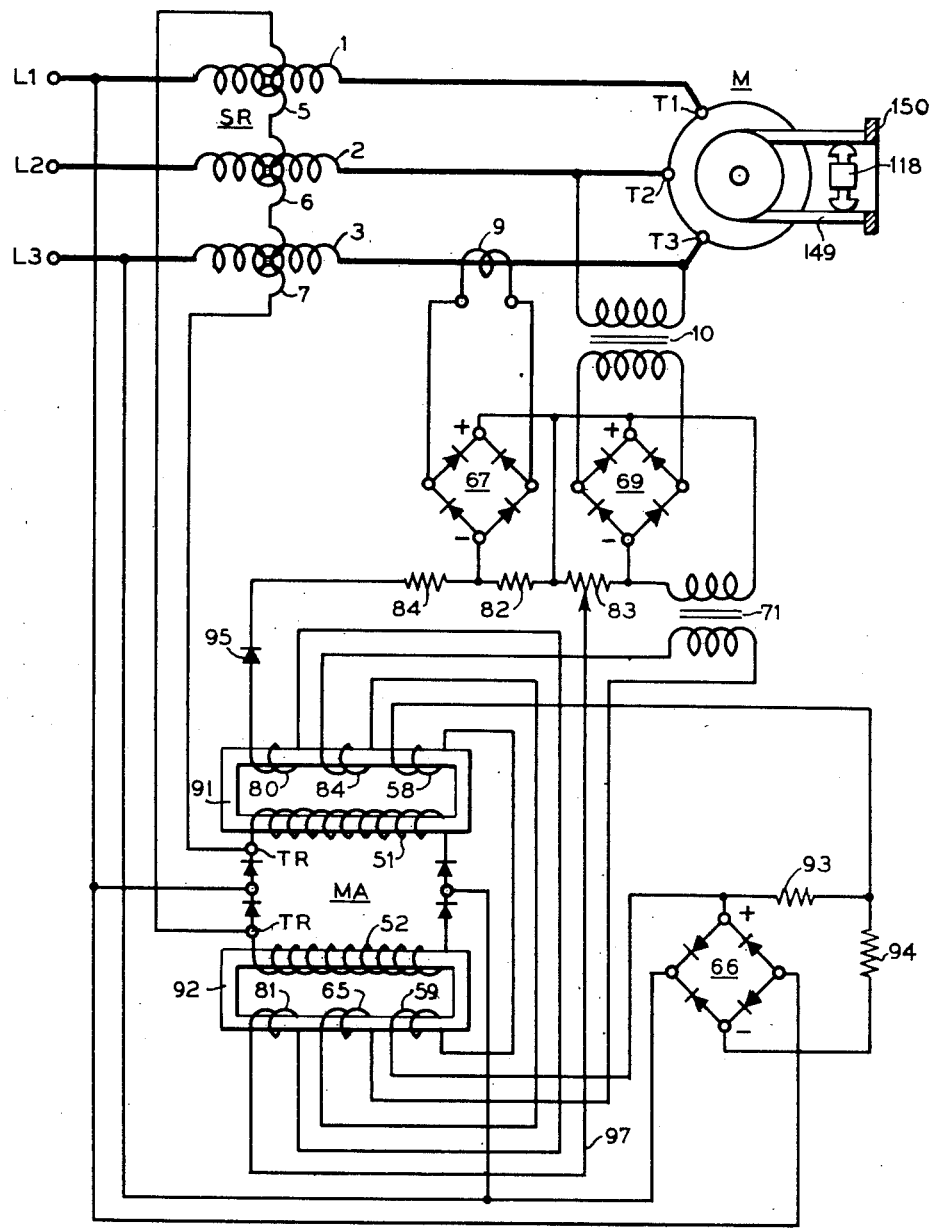
Fig. 6 shows schematically a control system equipped with a squirrel-cage motor of adjustable rotor resistance.

The motor control system shown in Fig. 6 is provided with a motor generally of the squirrel-cage type but designed to permit a change in rotor resistance.

The effective impedance of device SR and hence the power supply to the motor M are controlled by the direct current supplied to the saturation control coils 5, 6, 7 from the output terminals $T_R$ of a magnetic amplifier MA. The magnetizable cores 91, 92 of the respective main windings 51, 52 in amplifier MA are provided with three pairs of direct-current coils 58 and 59, 64 and 65, 80 and 81, corresponding to the analogously designated coils in Fig. 5. As in the system of Fig. 5, coils 58, 59 provide constant bias and are energized from across a resistor 93 connected to a rectifier 66 in series with a calibrating resistor 94; and coils 64 and 65 are connected to a damping transformer 71 for stabilizing purposes. The actual impedance control is effected by coils 80 and 81 also as described with reference to the corresponding coils and their circuits in Fig. 5. A half-wave rectifier 95 is shown connected in the circuit of coils 80, 81 to prevent reversal in current flow. The ratio $$\frac{E_T}{I_L}$$

can be set or calibrated as desired by means of the rheostat 83, and this ratio remains fixed during normal performance of the system. The amplifier MA operates to control the saturable reactor device SR for constant input impedance of the motor as explained above, so that the motor tends to run at a stable subsynchronous speed determined only by the resistance in the rotor circuit.

Figure 7:
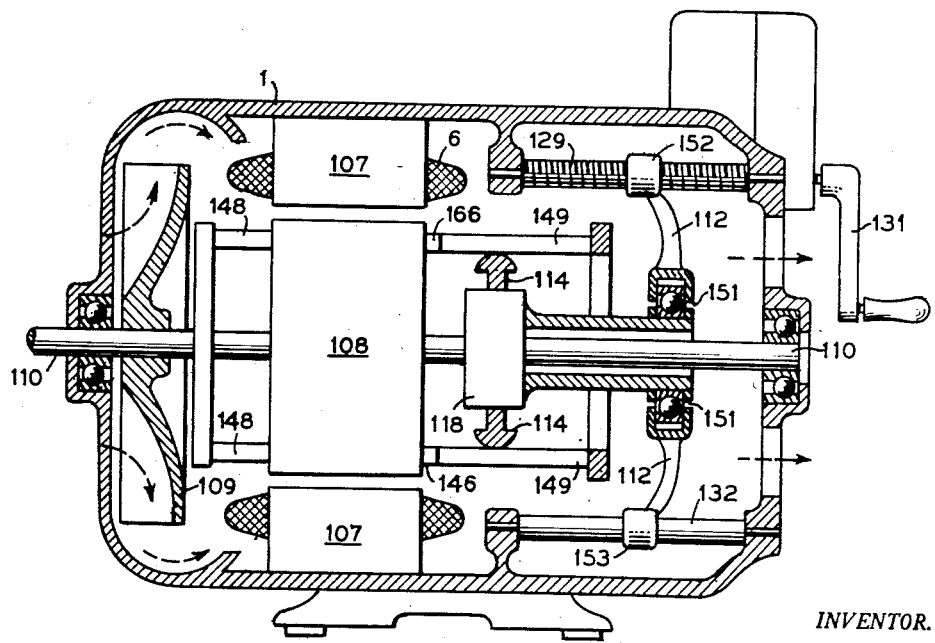
Fig. 7 shows schematically and in cross-section a squirrel-cage motor applicable in the system of Fig. 6.

In order to vary the resistance of the squirrel-cage rotor to effect a change in speed, the motor M is equipped with a displaceable control assembly 118 shown more in detail in Fig. 7.

The stator 107 of the motor is of standard construction. The rotor 108 is of special construction as far as the rotor bar assembly is concerned. Ventilation of the motor is obtained by means of a centrifugal fan 109. If the particular use to which the motor is to be put requires continuous operation at low speeds, a separately driven blower for forced air-cooling should be provided.

The rotor bar assembly shown in Fig. 7 comprises pairs of conductor bars 148 and 149 which extend through the rotor 108 and are joined together on the air intake side by a conductor ring 147 and on the air outlet side by a ring 150. Each two bars 148 and 149 are rigidly joined together at junction 146 by brazing or welding. Ring 147 and rotor bar portions 148 consist of a material of high electric conductivity. Rotor bar portions 149 and ring 150 are made of resistance material. This particular design assures that most of the heating in the rotor circuit occurs in bars 149 and ring 150 which are located on the air outlet side of the motor.

The slider assembly 118 permits varying the resistance of the rotor bar assembly as follows. The slider assembly can be moved axially along the motor shaft 110 by means of a crank 111. The effective resistance of the rotor circuit is thus mostly determined by the distance between junction 146 and the point at which a shoe 114 of the slider assembly is in contact with the adjacent rotor bar 149. The contact shoes 114 press against the respective bars 149 by centrifugal force when the rotor is rotating or they may be pressed against the rotor bars by spring action if the motor is to have a large range of speeds. All contact shoes 114 of the slider assembly 118 are electrically connected together, for instance by braided copper conductors. The shoes 114 and the connecting conductor are of high-conductivity material. The pressure with which the shoes bear against the bars 149 must be adequate to minimize contact resistance to permit effective short-circuiting of bars 149 at the point of shoe contact.

The assembly 118 is rigidly mounted on a sleeve 113 rotating together with the shaft 110. The sleeve 113 is rigidly connected to the inner race of a bearing 151, which inner race also rotates together with shaft 110. The outer race of bearing 151 is housed in a control arm 112. The arrangement is such that the assembly 114 and the sleeve 113 may rotate while the control arm 112 is stationary. As control arm 112 is moved axially along shaft 110, the slider assembly 118 moves the same amount.

A crank 131 is connected with a worm spindle 129 meshing with a threaded portion 152 of control arm 112. Another portion 153 of control arm 112 is in slidable engagement with a guide pin 132. Rotation of crank 131 causes the slider assembly 118 to move along shaft 110 thus permitting a stepless variation in resistance of the rotor bar assembly.

It will be recognized that any selected adjustment of the slider assembly 118 effected by rotation of crank 131 corresponds to a selected resistance setting of the rotor and, by virtue of the constant-input impedance regulation, causes the motor to run at a corresponding stable speed.

As is apparent from the variety of embodiments described in the foregoing, the invention permits of a great diversity of modifications and may be embodied in systems and with the aid of components other than those specifically illustrated and described, without departing from the essential features of the invention and within the scope of the claims annexed hereto.

I claim:

1. A speed-regulated alternating-current motor control system, comprising an induction motor having stator terminals and having a rotor circuit, an alternating-current supply circuit connected with said terminals and having control means for varying the stator-terminal voltage, voltage-responsive means connected with said circuit to provide a signal proportional to said terminal voltage, current-responsive means connected with said supply circuit to provide a signal proportional to the current in said supply circuit, a ratio-forming device connected with said voltage-responsive means and with said current-responsive means, said device having an output circuit responsive to a normally fixed ratio of voltage-responsive signal to current-responsive signal, said output circuit being connected with said control means to control said supply circuit for constant input impedance of said motor, and said rotor circuit having resisance means selectively adjustable for controlling the motor speed, whereby different selected settings of said resistance means correspond to respectively different values of regulated stable speed of said motor.

2. A speed-regulated alternating-current motor control system, comprising an induction motor having stator terminals and having a rotor circuit, an alternating-current supply circuit connected with said terminals, a saturable reactor device having main windings series-connected in said supply circuit and having saturation control coils for varying the effective reactance of said main windings to control the stator-terminal voltage, voltage-responsive means connected with said circuit to provide a signal proportional to said terminal voltage, current-responsive means connected with said supply circuit to provide a signal proportional to the current in said supply circuit, a ratio-forming device connected with said voltage-responsive means and with said current-responsive means, said device having an output circuit responsive to a normally fixed ratio of voltage-responsive signal to current-responsive signal, said output circuit being connected with said saturation control coils to vary said terminal voltage for constant input impedance of said motor, and said rotor circuit having resistance means selectively adjustable for controlling the motor speed, whereby different selected settings of said resistance means correspond to respectively different values of regulated stable speed of said motor.

3. A speed-regulated alternating-current motor control system, comprising an induction motor having stator terminals and having a rotor circuit, and having control means for varying the stator-terminal voltage, a voltage transformer connected across said stator terminals to provide a signal proportional to said terminal voltage, a current transformer connected with said supply circuit to provide a signal proportional to the current in said supply circuit, a ratio-forming device inputwise connected with said two transformers and having an output circuit responsive to the ratio of said voltage-responsive signal to said current-responsive signal, said output circuit being connected with said control means to control said supply circuit for constant input impedance of said motor, and said rotor circuit having resistance means selectively adjustable for controlling the motor speed, whereby different selected settings of said resistance means correspond to respectively different values of regulated stable speed of said motor.

4. A speed-regulated alternating-current motor control system, comprising an induction motor having stator terminals and having a rotor circuit, an alternating-current supply circuit connected with said terminals, a saturable reactor device having main windings series-connected in said supply circuit and having saturation control coils for varying the effective reactance of said main windings to control the stator-terminal voltage, a current transformer connected with said supply circuit to provide a signal proportional to the current in said supply circuit, a ratio-forming device inputwise connected with said two transformers and having an output circuit responsive to the ratio of said voltage-responsive signal to said current-responsive signal, said output circuit being connected with said saturation control coils to vary said terminal voltage for constant input impedance of said motor, and said rotor circuit having resistance means selectively adjustable for controlling the motor speed, whereby different selected settings of said resistance means correspond to respectively different values of regulated stable speed of said motor.

5. A speed-regulated alternating-current motor control system, comprising an induction motor having stator terminals and having a rotor circuit, and having control means for varying the stator-terminal voltage, a voltage transformer connected across said stator terminals to provide a signal proportional to said terminal voltage, a current transformer connected with said supply circuit to provide a signal proportional to the current in said supply circuit, a ratio-forming device inputwise connected with said two transformers and having an output circuit responsive to a fixed ratio of said voltage-responsive signal to said current-responsive signal, said output circuit being connected with said control means to control said supply circuit for constant input impedance of said motor, adjustable rheostat means connected between said ratio-forming device and one of said transformers for setting said proportion to a desired value, and said rotor circuit having resistance means selectively adjustable for controlling the motor speed, whereby different selected settings of said resistance means correspond to respectively different values of regulated stable speed of said motor.

6. A speed-regulated alternating-current motor control system, comprising an induction motor having stator terminals and having a rotor circuit, an alternating-current supply circuit connected with said terminals and having control means for varying the stator-terminal voltage, voltage-responsive means connected with said circuit to provide a signal proportional to said terminal voltage, current-responsive means connected with said supply circuit to provide a signal proportional to the current in said supply circuit, a mixer-amplifier having input-circuit means and having an output circuit connected with said control means, said voltage-responsive means and said current-responsive means being connected with said input-circuit means in differential relation to each other and with the poling required for negative voltage feedback and positive current feedback respectively, each of said two signals having a larger order of magnitude than the differential effect of both signals, said amplifier having a gain sufficient to make the current in said output circuit proportional to the ratio of voltage signal to current signal, and said rotor circuit having resistance means selectively adjustable for controlling the motor speed.

7. A speed-regulated alternating-current motor control system, comprising an induction motor having stator terminals and having a rotor circuit, an alternating-current supply circuit connected with said terminals and having control means for varying the stator-terminal voltage, a voltage transformer connected across said stator terminals to provide a signal proportional to said terminal voltage, a current transformer connected with said supply circuit to provide a signal proportional to the line current in said supply circuit, a magnetic amplifier having input circuit means and having an output circuit responsive in a fixed proportion to the ratio of voltage-responsive signal to current-responsive signal, said output circuit being connected with saturation control coils, two rectifiers connected between said input circuit means of said amplifier and said respective transformers and poled for negative voltage feedback and positive current feedback respectively whereby the amplifier responds to the difference of said current-responsive signal and said voltage-responsive signal, said two signals having each a larger order of magnitude than said difference, said amplifier having a gain sufficient to make the current in said output circuit proportional to a fixed ratio of voltage signal to current signal, and said rotor circuit having resistance means selectively adjustable for controlling the motor speed.

8. In a speed-regulated alternating-current motor control system according to claim 7, said input-circuit means of said amplifier comprising two mutually insulated saturation coil circuits connected with said respective rectifiers and poled in mutually opposed relation to each other, at least one of said coil circuits having resistance means adjustable for setting a desired value of said ratio.

9. In a speed-regulated alternating-current motor control system according to claim 7, said input-circuit means of said amplifier comprising a saturation coil circuit having two resistors connected in series with each other, each of said resistors being connected across one of said respective rectifiers to be impressed by rectified voltage, and said voltage of said respective resistors being poled in opposition to each other, at least one of said resistors being adjustable for varying one of said resistor voltages to set a desired value of said ratio.

10. A speed-regulated alternating-current motor control system, comprising an induction motor having stator terminals and having a rotor circuit, line terminals, a supply circuit connecting said line terminals with said stator terminals and comprising variable impedance means for varying the stator-terminal voltage, voltage-responsive means connected with said supply circuit to provide a signal proportional to said terminal voltage, current-responsive means connected with said supply circuit to provide a signal proportional to the current in said supply circuit, a ratio-forming device connected with said voltage-responsive means and with said current-responsive means, said device having an output circuit responsive to a fixed ratio of voltage-responsive signal to current-responsive signal, said ratio being equal to the ratio of the line voltage at said line terminals to the rated current of said motor, said output circuit being connected with said control means to control said impedance means for constant input impedance of said motor, and said rotor circuit having resistance means selectively adjustable for controlling the motor speed, whereby different selected settings of said resistance means correspond to respectively different values of regulated stable speed of said motor.

No references cited.